United States Patent
Clössner et al.

(10) Patent No.: US 10,618,749 B2
(45) Date of Patent: Apr. 14, 2020

(54) DEVICE, TRANSPORT MOVER, AND TRANSPORT MOVER SYSTEM

(71) Applicant: Weber Maschinenbau GmbH Breidenbach, Breidenbach (DE)

(72) Inventors: Stephan Clössner, Ehringshausen (DE); Christoph Kuhmichel, Bad Laasphe (DE)

(73) Assignee: Weber Maschinenbau GmbH Breidenbach (DE)

( * ) Notice: Subject to any disclaimer, the term of this patent is extended or adjusted under 35 U.S.C. 154(b) by 0 days.

(21) Appl. No.: 16/093,021

(22) PCT Filed: Apr. 6, 2017

(86) PCT No.: PCT/EP2017/058237
§ 371 (c)(1),
(2) Date: Oct. 11, 2018

(87) PCT Pub. No.: WO2017/178328
PCT Pub. Date: Oct. 19, 2017

(65) Prior Publication Data
US 2019/0152725 A1    May 23, 2019

(30) Foreign Application Priority Data
Apr. 11, 2016 (DE) .................. 10 2016 106 621

(51) Int. Cl.
*B65G 54/02*    (2006.01)
*B65G 54/00*    (2006.01)
(Continued)

(52) U.S. Cl.
CPC ............. *B65G 54/02* (2013.01); *B65G 37/02* (2013.01); *B65G 54/00* (2013.01); *B65G 23/23* (2013.01)

(58) Field of Classification Search
CPC ........ B65G 54/00; B65G 54/02; B65G 35/00; B65G 37/00; B65G 37/02; B65G 23/23; B65G 21/22; B61B 13/08
(Continued)

(56) References Cited

U.S. PATENT DOCUMENTS

| | | |
|---|---|---|
| 2,757,786 A | 8/1956 | Grebe |
| 4,841,869 A | 6/1989 | Takeuchi et al. |

(Continued)

FOREIGN PATENT DOCUMENTS

| | | |
|---|---|---|
| DE | 3702248 C2 | 8/1987 |
| DE | 19510281 C1 | 12/1995 |

(Continued)

OTHER PUBLICATIONS

Communication received from the European Patent Office for related PCT Patent Application No. PCT/EP2017/058237; dated Jul. 6, 2017; 6 pages.

(Continued)

*Primary Examiner* — James R Bidwell
(74) *Attorney, Agent, or Firm* — Dickinson Wright PLLC

(57) ABSTRACT

An apparatus for moving objects comprising a plurality of transport movers individually movable by means of magnetic conveying technology and/or linear motor technology for transporting the objects; a path system for the transport movers in which the transport movers are movable along at least one predefined path in a transport direction; and a control device for controlling the movements of the transport movers in the path system, wherein the path system has a guide for the transport movers which extends along the path, characterized in that at least one rolling element or sliding element is arranged at each transport mover; and in that the guide takes up at least substantially vertical forces via the rolling element or sliding element, with the guide (Continued)

having at least one running surface, which extends along the path, for the rolling element or sliding element.

17 Claims, 8 Drawing Sheets

(51) Int. Cl.
 *B65G 37/02* (2006.01)
 *B65G 23/23* (2006.01)
(58) Field of Classification Search
 USPC .............................................. 198/805, 468.9
 See application file for complete search history.

(56) References Cited

U.S. PATENT DOCUMENTS

| | | | | |
|---|---|---|---|---|
| 5,072,144 | A * | 12/1991 | Saito | H02K 41/035 310/12.19 |
| 6,326,708 | B1 * | 12/2001 | Tsuboi | B60L 15/005 310/12.06 |
| 6,601,696 | B1 * | 8/2003 | van Zijderveld | B65G 21/2009 198/805 |
| 6,700,228 | B2 * | 3/2004 | Teramachi | F16C 29/06 310/12.15 |
| 7,458,454 | B2 * | 12/2008 | Mendenhall | B65G 35/06 198/377.02 |
| 10,093,486 | B2 * | 10/2018 | Andreoli | B65G 21/2009 |
| 2002/0117378 | A1 * | 8/2002 | Buchi | B65G 23/18 198/619 |
| 2012/0186948 | A1 | 7/2012 | Ishino et al. | |
| 2015/0041288 | A1 * | 2/2015 | van de Loecht | B65G 23/18 198/805 |
| 2015/0274433 | A1 * | 10/2015 | Hanisch | B65G 54/02 198/805 |
| 2016/0083197 | A1 | 3/2016 | Otto | |
| 2018/0265230 | A1 * | 9/2018 | Burk | A22C 17/0093 |

FOREIGN PATENT DOCUMENTS

| | | |
|---|---|---|
| DE | 102006034395 A1 | 2/2007 |
| DE | 102014104400 A1 | 10/2015 |
| DE | 102014106400 A1 | 11/2015 |
| DE | 102016106621 A1 | 10/2017 |
| EP | 2979998 A1 | 2/2016 |
| EP | 3002234 A1 | 4/2016 |
| FR | 2355577 A2 | 1/1978 |
| GB | 648290 A | 1/1951 |
| WO | 2014118716 A2 | 8/2014 |

OTHER PUBLICATIONS

Communication received from the German Patent Office for related German Patent Application No. DE 102016106621.4; dated Dec. 6, 2016; 2 pages.

* cited by examiner

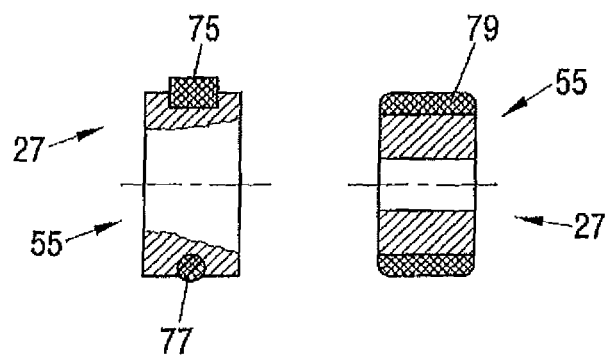
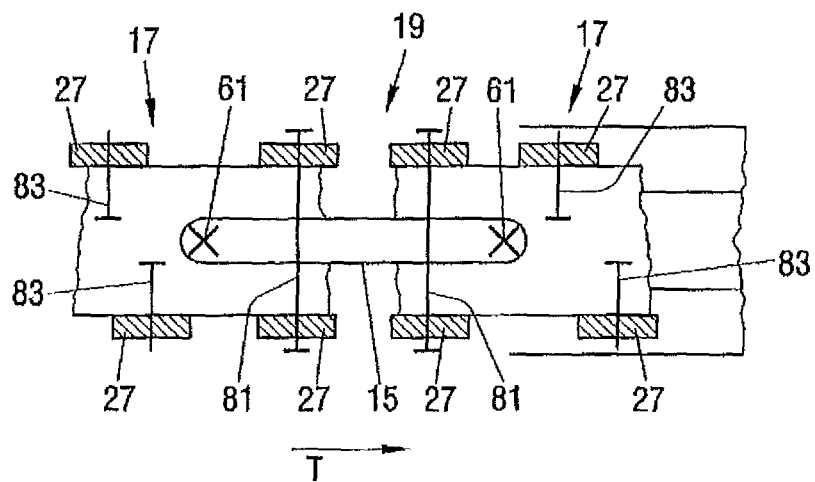

DEVICE, TRANSPORT MOVER, AND TRANSPORT MOVER SYSTEM

CROSS-REFERENCES TO RELATED APPLICATIONS

This application is a 371 National Phase Application of Patent Application PCT/EP2017/058237, filed on Apr. 6, 2017, which claims the priority of German Application No. 102016106621.4 filed on Apr. 11, 2016, each of which is incorporated herein by reference, in its entirety.

FIELD OF THE INVENTION

The present invention relates to an apparatus for moving objects comprising a plurality of transport movers individually movable by means of magnetic conveying technology and/or linear motor technology for transporting the objects; a path system for the transport movers in which the transport movers are movable along at least one predefined path in a transport direction; and a control device for controlling the movements of the transport movers in the path system, wherein the path system has a guide for the transport movers which extends along the path. The present invention additionally relates to a transport mover for transporting objects having a functional region and a holder for carriers for objects to be transported which is attached above the functional region. The present invention furthermore relates to a transport mover system.

BACKGROUND

An apparatus for moving portions which comprise at least one slice of a food product is known from DE 10 2014 104 400 A1. This apparatus comprises a plurality of individually movable transport movers; a path system for the transport movers in which the transport movers are movable along at least one predefined path in a transport direction; and a control device for controlling the movements of the transport movers in the path system. The transport movers have a runner cooperating with the path system and a carrier for at least one portion attached to the runner via a holder. Guide rails configured as metal angle sheets serve as a guide and engage into slits at the left and right side surfaces of the runner.

It is the underlying object of the present invention to provide, in particular with respect to robustness, compactness, cleaning capability and payload, an improved apparatus for moving objects and an improved transport mover or an improved transport mover system.

The object is in particular satisfied in that an apparatus for moving objects of the initially named kind is developed further in that at least one rolling element or sliding element is arranged at each transport mover; and in that the guide takes up at least substantially vertical forces via the rolling element or sliding element, with the guide having at least one running surface, which extends along the path, for the rolling element or sliding element.

In the apparatus in accordance with the invention, the guide thus satisfies a dual function since it not only serves as a guide for the transport movers, but also provides the support surface and running surface for the rolling element or sliding element. The guide in this respect takes up at least substantially vertical forces such that the rolling element or sliding element is normally located above the running surface and the weight of the transport mover is thus transferred via the rolling element or sliding element at least substantially in a vertical direction onto the running surface.

The rolling element is preferably a roller and the sliding element is preferably a sliding runner which can respectively roll or slide along the running surface. No friction resistance, or at most only a small friction resistance, results in a rolling element between the guide and the mover in this respect.

The friction resistance can also be kept low on the use of a sliding element, in particular when the sliding element is designed from a slidable material. Abrasion and wear at the running surface and/or at the rolling element or sliding element can thus be kept low. In addition, the rolling element or sliding element can be replaceably attached to the mover such that it can, for example, be replaced in the event of wear.

SUMMARY

In accordance with a preferred embodiment of the invention, the guide comprises two parallel guide rails, with the upper side of one guide rail being provided as a running surface for at least one rolling element or sliding element which is formed at a longitudinal side of a transport mover, and with the upper side of the other guide rail being provided as a running surface for at least one rolling element or sliding element which is formed at the other longitudinal side of the transport mover. A stable, secure and inexpensive guide for the movers is provided by the two guide rails which extend in parallel with one another and on whose respective upper side the rolling elements or sliding elements of the mover are disposed and can roll off or slide.

In accordance with a preferred embodiment of the invention, each guide rail comprises a protrusion at its side facing the other guide rail and each longitudinal side of a transport mover comprises a projection, with a respective projection engaging beneath a respective protrusion when the transport mover is arranged on the guide rails. The transport mover can thereby be protected against an upward falling out, e.g. during a cornering.

The projection can extend at a spacing beneath the rolling element or sliding element such that an outwardly open gap is formed between the rolling element or sliding element and the projection. The protrusion of the associated guide rail can engage into this gap. The gap therefore has a width which at least corresponds to the thickness of the protrusion or the gap width is slightly larger than the thickness of the protrusion.

The projection can be considered as a lateral sliding guide which, together with the gap, ensures a correct alignment of the roller pairs when cornering and when travelling straight ahead. The rolling elements or sliding elements in particular take over the bearing function, while the sliding guide and the gap mainly take over the guidance function, in particular laterally.

The guide rails can, for example, be configured as metal angle sheets whose respective upper sides form the running surface for the movers and whose free ends are aligned toward one another such that the free ends of the metal angle sheets form the protrusions which engage into the gaps which are formed at the longitudinal sides of the movers.

The invention also relates to a transport mover for transporting objects, in particular having an apparatus in accordance with the invention, wherein the transport mover has a functional region and, above said functional region, a holder for carriers for objects to be transported which is attached to the functional region, with at least one rolling element or sliding element and, at a spacing beneath it, a projection being provided at each of the two longitudinal sides of the functional region such that an outwardly open gap for the engagement of a protrusion, which is formed at an associated guide rail for the transport mover, is present between the rolling element or sliding element and the projection. The lateral guidance is improved by the engagement of the protrusion into the associated gap. The mover can thus be guided securely and in a stable manner. In addition, it can be prevented that the mover falls upwardly out of the guide, for example during a cornering.

The rolling elements or sliding elements are preferably removably arranged at the functional region. They can therefore be replaced, where necessary, e.g. if they are damaged or worn or should be adapted to specific applications, in particular to the payload to be transported.

The functional region is preferably formed in one piece. The functional region can thus have a compact and stable design.

The functional region is preferably formed from plastic such that it can be easily processed and can be manufactured with a small weight.

A magnetic region which is releasably fastened to the functional region can be provided beneath the functional region. The mover-side devices which are provided in a manner known per se for cooperating with the path-side magnetic conveying system are accommodated in the magnetic region. These regions can be manufactured independently of one another and can also be replaced or adapted, where necessary, due to the releasability of the magnetic region from the functional region.

In accordance with a preferred further development of the invention, the lower side, which is in particular flat, of the functional region and the upper side, which is in particular flat, of the magnetic region at least approximately contact one another when the magnetic region is fastened to the functional region. The connection between the magnetic region and the functional region can thus take place via a contour which at least substantially has an exact fit, preferably in a horizontal plane.

A peripheral seal, in particular an O-ring seal, is preferably arranged in a marginal region between the upper side and the lower side. The interior of the magnetic region is thereby sealed with respect to the outer region and is, for example, protected against penetrating water or cleaning means. A design of the connection region which also satisfies high hygiene demands is thus present.

Provision can in particular be made that the magnetic region is hollow and is designed as open at its upper side. The devices of the magnetic region can therefore be integrated into the magnetic region from the upper side. If the magnetic region is arranged at the functional region, the inner space of the magnetic region is protected with respect to the outer region due to the seal.

The seal can seal a possible gap between the upper side of the magnetic region and the lower side of the functional region at all sides. It is preferably inwardly offset somewhat behind the margin of the magnetic region and of the functional region. The seal can furthermore serve as tolerance compensation between the magnetic region and the functional region.

The seal is in particular at least partly received in a peripheral groove formed at the upper side and/or at the lower side. The seal can be securely held by the groove, e.g. during the assembly of the magnetic and functional regions. In addition, an improved sealing effect can be achieved.

A first passage, in particular a blind hole bore, can extend vertically upwardly in the functional region starting from the lower side of the functional region and a second passage, which in particular extends horizontally, can intersect the first passage to receive an axle of the transport mover.

A fastening element of the magnetic region, in particular a bolt-like element, for instance a mushroom head screw, fastened to the upper side of the magnetic region can be plugged into the first passage. The axle can be plugged into the second passage. The fastening element can be configured such that it engages behind the axle above the region in which the two passages intersect to fix and/or to tension the magnetic region with respect to the functional region. The fastening element fastened to the magnetic region engages from below into the first passage and it can be secured via the axle plugged into the second passage.

The axle can be arranged and/or fixed in the second passage in a manner secure against rotation. A rolling element or sliding element can be screwed onto an end of the axle. The end can be provided with a thread for this purpose. A co-rotation of the axle, in particular during the screwing on of the rolling element or sliding element and during a movement of the transport mover, is prevented by the arrangement of the axle in a manner secure against rotation.

The rolling element is preferably configured as a roller which in particular comprises a stainless steel bearing having a radially outwardly arranged race, e.g. comprising rubber.

The bearing can be screwed onto the thread of the axle. A screw which is tightened against the bearing can be screwed onto the thread before the screwing on of the bearing. It is particularly advantageous in this respect if the screw has a collar which has a larger diameter and if a complementary receiver for the collar is provided at the bearing, wherein the collar is received in the receiver by tightening the screw against the bearing. The bearing can thereby be securely fastened to the axle.

The axle can be pushed into the second passage of the functional region. A polygonal contour provided at the axle can engage into an associated counter-contour at the second passage to achieve a security against rotation.

The axle is preferably formed from a metal or from stainless steel. The fastening devices for fixing the magnetic region to the functional region are preferably also formed from a metal or from stainless steel.

The functional region can comprise at least one rolling element or sliding element together with a support, in particular in the form of at least one axle, as well as fastening elements for attachment parts which are in particular directed upwardly, such as a holder for an object carrier. Said object carrier can be configured as a plate or in the manner of a pot.

The holder is preferably rotatably connected to the functional region by means of a rotary axle. This is in particular advantageous when a holder is carried by two movers arranged behind one another since the system comprising two movers and a holder rotatably supported thereat then has a better cornering ability in comparison with a rigid fastening.

The rotary axle can be rotatably arranged in a passage which is preferably continuous and which extends in a vertical direction in the functional region. The rotary axle is preferably supported in the passage by means of at least one plain bearing. A plain bearing can, for example, be provided at an upper end and/or at a lower end of the passage to support the rotary axle with respect to the passage. The plain bearing at the upper end of the passage can have a collar which is disposed on the upper side of the functional region.

The at least one plain bearing can act horizontally and/or vertically and can also effect an additional damping.

The passage can extend continuously in a vertical direction through the functional region. The rotary axle can be secured at its lower end face by a screw which is screwed from below into a threaded bore at the lower end face.

The rotary axle can have an upper end face which is disposed above the functional region and which is provided as a support surface for the holder. A threaded bore can be provided at the end face into which a screw guided from above through an opening in the holder is screwed or can be screwed to fasten the holder to the rotary axle. The holder can thus be fastened to the rotary axle by means of the screw. A different fastening means can also be used instead of the screw.

The opening at the holder can be formed as at least substantially matching the end face of the rotary axle as a polygon, in particular as a square.

The functional region can have at least one pair of rolling elements, in particular a rear or front pair of rolling elements—viewed in a direction of movement of the transport mover—with one rolling element of the pair being arranged at the one longitudinal side of the functional region and the other rolling element of the pair being arranged at the other longitudinal side of the functional region, and with the two rolling elements having a common, continuous axle. The two rolling elements are thus located at the same level, viewed in the direction of movement of the transport mover, which can in particular be advantageous when travelling straight ahead. In addition, a uniform support of the transport mover can be achieved by the rolling elements.

In accordance with a preferred embodiment of the invention, the functional region has at least one pair of rolling elements, in particular a rear or front pair of rolling elements—viewed in the direction of movement of the transport mover—one rolling element of the pair being arranged at the one longitudinal side of the functional region and the other rolling element of the pair being arranged at the other longitudinal side of the functional region, and with at least one rolling element being offset with respect to the other rolling element along the direction of movement, in particular by approximately 10 to 30 millimeters. A better, smoother running behavior, in particular at transitions between path elements, can thereby be achieved. The offset between the rolling elements is in this respect in particular such that a transition between path elements is bridged. The rolling element which is set forward has thus already passed a transition between consecutive path elements and thus supports the mover, while the other rolling element is located in the transition region and possibly has no contact with the running surface for a brief time.

The transport mover preferably comprises a pair of rolling elements which have an offset, viewed in the direction of movement of the mover, and a further pair of rolling elements without an offset. The pair without an offset is preferably arranged at a common axle.

On the coupling of two transport movers to form a transport system, the pairs of rolling elements of the two transport movers which do not have any offset are preferably beside one another.

All the rolling elements, preferably four rolling elements, of a mover can also each be arranged at their own axles. In addition, all the rolling elements can have an offset relative to one another, viewed in the direction of movement. The offset can be of different sizes to be able to bridge gaps at transitions between path elements.

In accordance with a preferred embodiment of the invention, the transport mover has at least two rolling elements arranged offset in the direction of movement at each of its longitudinal sides, with the rolling elements being connected to one another via a connection element at each longitudinal side and being connected to the respective longitudinal side of the transport mover, with the connection element being arranged at the respective longitudinal side of the transport mover in a manner pivotable about a pivot axis. The rolling elements at each side of the transport mover can thus be arranged in the manner of an oscillating axle suspension at the transport mover by means of the connection element.

The connection element can have a first section whose one end is arranged at the pivot axis and at whose other, free end one of the rolling elements is arranged; and the connection element can have a second section whose one end is arranged at the pivot axis and at whose other, free end the other one of the rolling elements is arranged, with the two sections having the same length or having different lengths. A suspension supported at the center or off-center can thus be implemented. A different travel behavior of the transport mover can be achieved with an off-center suspension, that is with sections of the connection element that have different lengths. A more or less pronounced raising of a transport mover carrier after a joint between path elements or the like can in particular be achieved depending on the length of the sections. In dependence on the direction of movement, the position of the pivot axis can contribute to an advantageous, uniform moving of the load on travelling over joints.

The pivot axis can have an offset at one longitudinal side of the transport mover with respect to the pivot axis at the other longitudinal side of the transport mover, viewed in the direction of movement of the transport mover. A better travel behavior of the transport mover can thereby be implemented, in particular when two such transport movers are used as a transport mover system and are coupled to one another via a common holder.

The above statements likewise apply to a sliding element, even if only a rolling element is spoken of above. I.e. a rolling element can be replaced with a sliding element, such as a sliding runner. In this respect, the axle positions or the support points of the rolling elements can be utilized as fastening points for the sliding runners to ensure a simple replacement. The sliding runners can at least be profiled at a longitudinal side serving as a sliding surface. Radii or slopes/chamfers can in particular be provided in the corner region. A simpler running onto transitions and a running over of dirt is thereby made possible. The sliding surface can have a slight sphericity in the longitudinal direction and/or in the transverse direction. A transverse profiling and/or transverse grooves and/or a slanted contour in the sliding surface can serve as a scraper to laterally brush away contaminations from the path.

At least one support which is elastically deformable at least regionally can be provided between the holder and the functional region in at least one transport mover.

The support is preferably configured as a skateboard axle such that the holder is inclined by means of the support on a cornering.

A lubricant depot can be provided in the transport mover, e.g. in its functional region, for the lubrication of the running surface, that is of the rolling surfaces and sliding surfaces on the guide rails and of moveable parts at the mover. The dispensing of the lubricant can take place via nozzles.

A sliding element, such as a sliding runner, or a part region thereof, in particular the sliding surface of the sliding element, can be manufactured from a sintering material (metal, plastic) which is preferably porous. Said sintering material can be saturated with lubricant or it is used for distribution and acted on by lubricant from a depot in the transport mover for this purpose.

The lubrication can preferably take place at the transport mover via contact surfaces between the mover and the running surface. Sintering material, saturated materials and/or lubricant outlet passages can be provided in the region of the mover-side contact surface.

The lubricant can, for example, be introduced into the mover before, during or after cleaning or in a specific supplementary station (for example, in a branch of the path route). Special transport movers and aids having a lubrication function can also only be in operation on a path route at times.

The invention also relates to a transport mover system comprising at least two transport movers in accordance with the invention which are arranged behind one another and which have a common holder for carriers for objects to be transported, wherein the holder is fastened to the functional region of the two transport movers.

The invention also relates to a transport mover system comprising two transport movers which are coupled to one another via a holder such that the spacing between the two transport movers is adjustable. A larger spacing between the transport movers provides advantages on a cornering.

The transport movers can also be other transport movers than the described transport movers having rolling elements or sliding elements. The aspect of the adjustability of the spacing between two transport movers coupled to one another is thus not dependent on the specific configuration of the transport movers.

It is advantageous for at least one transport mover and the holder to be coupled to one another such that the transport mover can be adjusted relative to the holder in the transport direction. The rotary axle of the transport mover can be displaceably supported or arranged at the holder for this purpose.

The transport movers described herein have a large application spectrum. They are flexible, multi-functional and can be used with diverse attachments. A simple replacement of parts is possible and they can be disassembled easily. They can be monitored or controlled in a simple manner. They can have a robust and compact design such that they have a high payload or carrying capability with a small inherent weight. The transport movers are furthermore designed in accordance with hygienic aspects and can easily be cleaned. They are suitable for operation in an environment which is warm, cold, moist and at risk of contamination such as is, for example, often present in the region of food processing machines. In operation, they have a low friction resistance in the path route. They can be produced simply, in particular when the functional region is manufactured from plastic.

BRIEF DESCRIPTION OF THE DRAWINGS

The invention will be described in the following by way of example with reference to advantageous embodiments and to the enclosed Figures. There are shown, schematically in each case, FIG. 1 a perspective view of an apparatus for moving objects;

FIG. 6a a plan view of the transport mover of FIG. 4;

FIG. 6b a sectional view of the transport mover along the line B-B in FIG. 6a;

FIG. 7a a sectional view of a variant of a rolling element for a transport mover;

FIG. 7b a sectional view of another variant of a rolling element for a transport mover;

FIG. 8 a plan view of a transport mover system;

FIG. 14a a side view of a sliding element for a transport mover;

FIG. 14b a perspective view of the sliding element of FIG. 14a;

DETAILED DESCRIPTION

Figure 1:
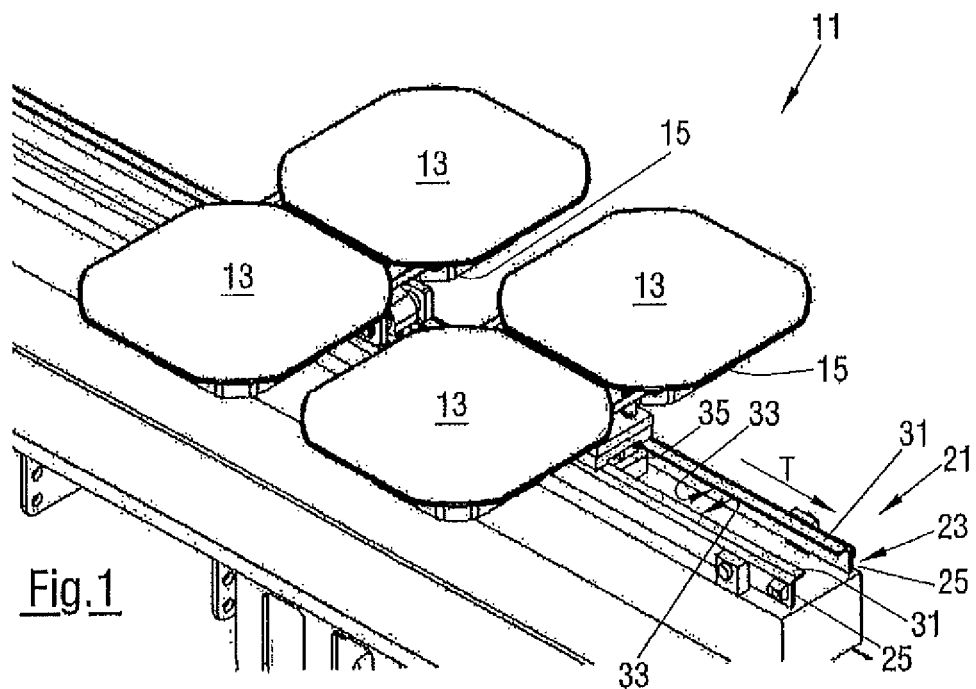

The apparatus 11 shown in FIG. 1 is provided for moving objects which are placed on the upper side of plate-like carriers 13. The objects can, for example, be portions which each comprise at least one slice cut off from a food product, in particular by means of a high-speed slicer.

The carriers 13 are placed on a holder 15 or fixed therein, wherein a holder 15 can receive two carriers 13 disposed next to one another transversely to the transport direction T. A respective holder 15 is carried by two transport movers 17 arranged behind one another along the transport direction T. Such an arrangement of two transport movers 17 behind one another which have a common holder 15 is also called a transport mover system 19 herein.

Figure 2:
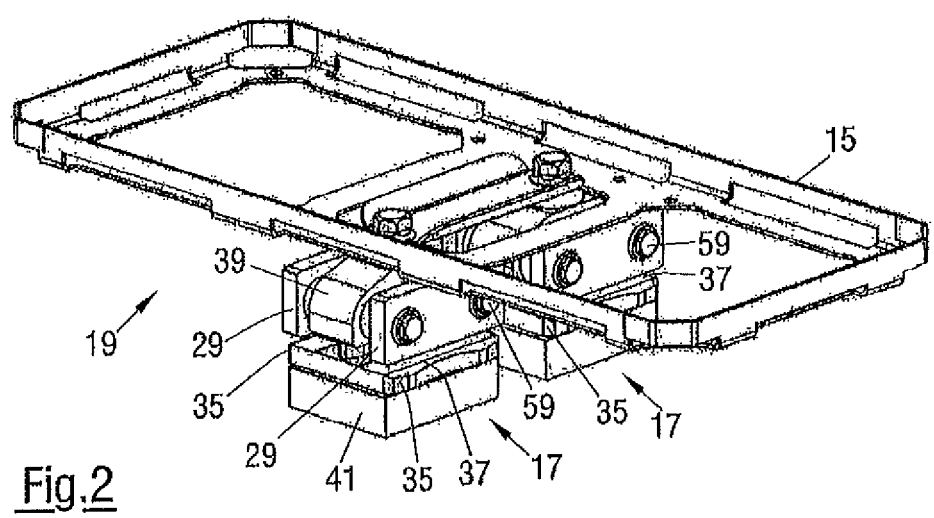
FIG. 2 a perspective view of a transport mover system of the apparatus of FIG. 1.
Figures 3, 4:
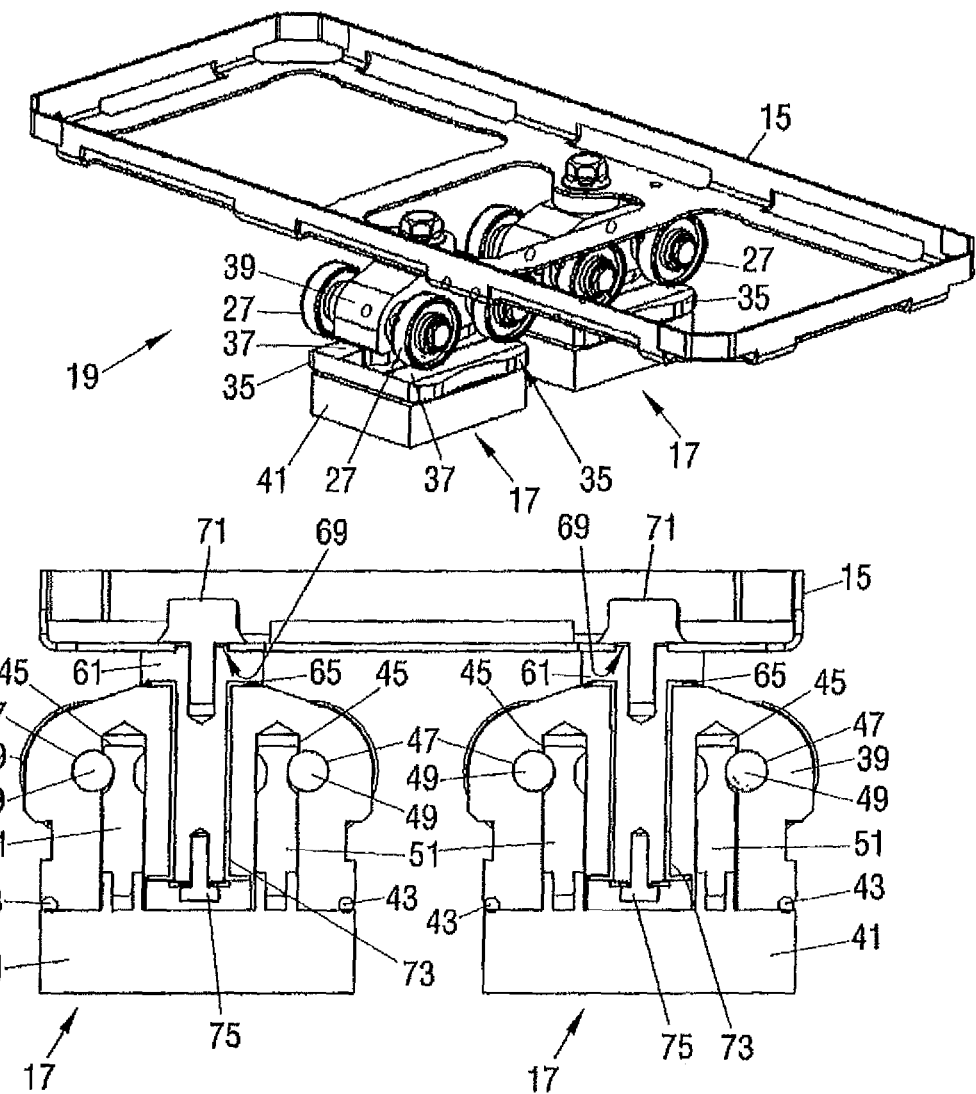
FIG. 3 a perspective view of a modified transport mover system of the apparatus of FIG. 1.
FIG. 4 a longitudinal section through the transport mover system of FIG. 3.

Examples of such transport mover systems 19 are shown in FIGS. 2 and 3 in a perspective representation. In the representation of FIG. 1, two transport mover systems are arranged behind one another viewed in the transport direction T. The transport direction T corresponds to the direction of movement of the transport movers.

The apparatus 11 of FIG. 1 comprises a path system 21 which is only shown sectionally in FIG. 1. The transport movers 17 are movable along a predefined path in the path system 21. The transport direction or direction of movement T of the transport movers 17 is thus predefined by the path system 21.

The movement of the transport movers 17 in the path system 21 takes place by means of a magnetic conveying technology and/or linear motor technology which is known per se. In the system shown, it takes place by substantially vertically acting magnetic forces between the linear motor of the path system 21 and the magnetic region 41 of a transport mover 17. In accordance with the invention, this also includes drives with a horizontal action of magnetic forces as a drive system. The apparatus 11 has a control device, not shown, for controlling the movements of the transport movers 17 in the path system 21. The control device and the process of controlling the transport movers 17 along the path are known per se.

The path system 21 has a guide 23 for guiding the transport movers 17 along the path, said guide being formed by two parallel guide rails 25 in the variant shown in FIG. 1. At least one rolling element 27 (cf. FIG. 3) or at least one sliding element 29 (cf. FIG. 2) is arranged at each longitudinal side of a transport mover 17. A sliding element 29 configured as a sliding runner is in particular arranged at each longitudinal side of the transport mover 17 of FIG. 2. The transport mover 17 of FIG. 3, in contrast, has two rolling elements 27 configured as rollers at each longitudinal side.

The respective rolling element or sliding element 27, 29 is disposed on the upper side 31 of one of the guide rails 25 and rolls or slides on this upper side 31 when the transport mover 17 moves along the transport direction T. The guide rails 25 therefore mainly take up vertical forces via the rolling elements or sliding elements 27, 29 arranged on them and provide a running surface (surfaces 31) for the rolling elements or sliding elements 27, 29.

As FIG. 1 shows, each guide rail 25 is configured as a metal angle sheet. The upper, free ends of the metal angle sheets face one another. The free ends of each metal angle sheet form a respective protrusion 33 which engages beneath a projection 35 formed at each longitudinal side of a transport mover 17 when the rolling elements or sliding elements 27, 29 of the transport mover are arranged on the guide rails 25. The projection 35 is arranged at a spacing beneath the rolling elements or sliding elements 27, 29 such that an outwardly open gap 37 is formed between the rolling elements or sliding elements 27, 29 and the projection 35 (see also FIG. 6b). The respective protrusion 33 projects into this gap, whereby the transport mover 17 is secured against falling out.

The width of the gap 37—measured from the lower side of the rolling elements or sliding elements 27, 29 up to the upper side of the projection 35—is preferably selected such that it is slightly larger, for example a few millimeters, than the thickness of the protrusion 33 or of the free end of the metal angle sheet forming a guide rail 25.

In addition to a so-called functional region 39, the transport mover 17 has a magnetic region 41 attached to the functional region 39. As FIGS. 2 to 4 show, the holder 15 is located above the functional region 41 to which the holder 15 is attached. The magnetic region 41 is, in contrast, located beneath the functional region 39. The rolling elements or sliding elements 27, 29 are arranged at each of the two longitudinal sides of the functional region 39 and, at a spacing beneath them, a respective projection 35 is formed such that the outwardly open gap 37 is formed at each longitudinal side of the transport mover 17 in the region of the functional region 39.

The functional region 39 is preferably formed in one piece, for example from plastic, and has a flat lower side which is contacted by the likewise flat upper side of the magnetic region 41. A peripheral O-ring seal 43 which is preferably received in a peripheral groove formed at the upper side and/or at the lower side is provided in the marginal region between the upper side and the lower side of the two regions 39, 41. The seal 43 seals the gap of the interface between the functional region 39 and the magnetic region 41 at all sides. The seal 43 is preferably inwardly offset somewhat behind the outer side of the functional region 39 or of the magnetic region 41. The seal 43 can also serve as tolerance compensation between the functional region 39 and the magnetic region 41.

Figures 5, 6:
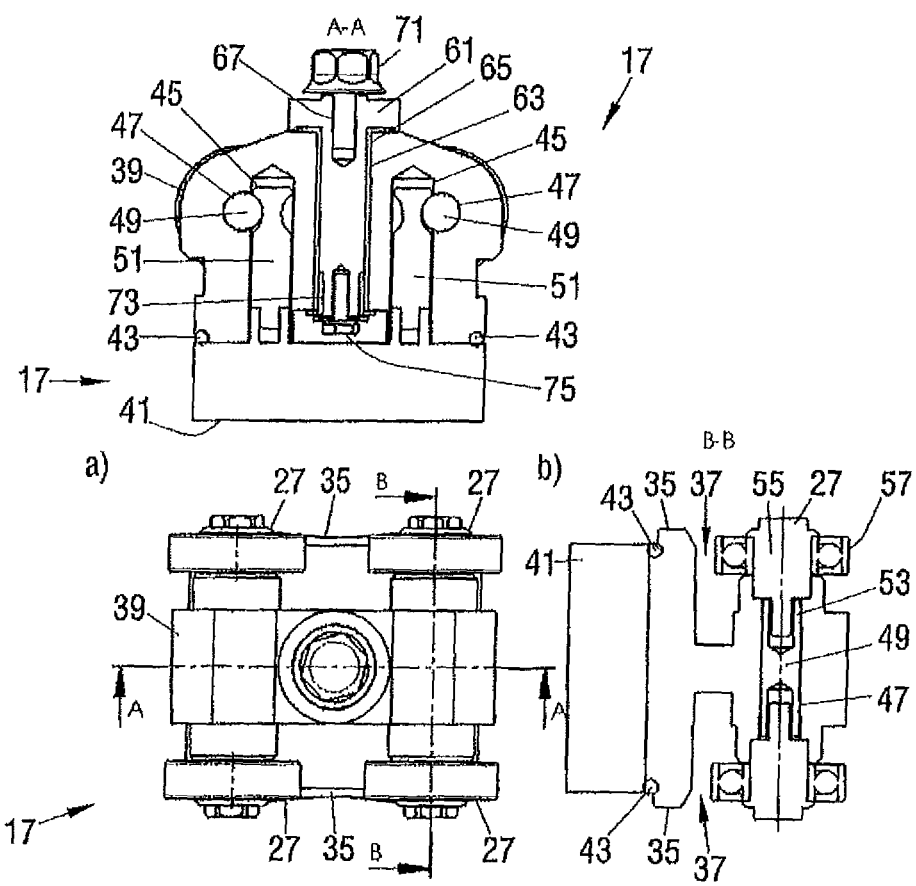
FIG. 5 a longitudinal section along the line A-A shown in FIG. 6a through a transport mover of the transport mover system of FIG. 4.

As FIGS. 4 and 5 show, two first passages 45 configured in the form of a blind hole bore are formed in the functional region 39 and extend vertically upwardly from the lower side of the functional region 39. Each first passage 45 is intersected by a horizontally extending second passage 47 passing through the functional region 39. Each second passage 47 is provided for receiving an axle 49 for the rolling elements or sliding elements 27, 29 of the transport mover 17.

A fastening element 51 configured as a mushroom head screw is plugged into each first passage 45 and is fixed to the upper side of the magnetic region 41 in that it is screwed into a thread provided at the upper side of the magnetic region 41.

The fastening element 51 has a recess complementary to the axle 49 at a spacing from the upper side of the magnetic region 41 which substantially corresponds to the spacing of the second passage 47 from the upper side of the magnetic region 41. If the axle 49 is plugged into the second passage 47, the upper, free end of the fastening element 51 engages behind the axle 49 above the region in which the two passages 45, 47 intersect. A fixing or a tensioning of the magnetic region 41 with respect to the functional region 39 thereby takes place. A secured connection between the functional region 39 and the magnetic region 41 is thus implemented.

Each axle 49 is preferably formed from stainless steel. Each axle 49 is arranged in the respective second passage 47 in a manner secure against rotation.

A central prolongation 53 which has an external thread can be provided at each rolling element 27 such that the prolongation 53 can be screwed into an internal thread at the axle 49 in order to fasten a respective rolling element 27 to the axle (cf. FIG. 6b). Each rolling element 27 can have a bearing 55 which, for example, comprises stainless steel and which is coupled to the prolongation 53; and a radially outwardly disposed race 57.

A sliding element 29 can be fixed to the functional region 39 by means of screws 59, wherein—comparable with a rolling element 27—a respective screw 59 can be screwed into an internal thread of an axle 49 (the screws 59 are shown in FIG. 2).

The holder 15 is rotatably connected to the functional region 39 by means of a rotary axle 61. The rotary axle 61 is in this respect rotatably arranged in a further passage 63 which extends in the vertical direction within the functional region 39 (cf. FIG. 5).

A plain bearing 65 can be provided at the upper end of the passage 63 for the rotatable support of the rotary axle 61 at the functional region 39. It can have a collar which is disposed on the upper side of the functional region 39, whereby the plain bearing 65 is fixed in its position in the passage 63. The plain bearing 65 can act horizontally and/or vertically.

A further plain bearing 73 can also be provided in the lower region of the passage 63; it can likewise act horizontally and/or vertically and it ensures the rotational movability of the rotary axle 61 with respect to the functional region 39. A damping effect can furthermore be achieved by the plain bearing or plain bearings 65, 73.

As FIG. 5 shows, the rotary axle 61 projects beyond the functional region 39 and has an end face, which serves as a support surface for the holder 15, at its upper side (cf. FIG. 4). A threaded bore 67 is provided at the end face of the rotary axle 61 and a screw 71 projecting from above through an opening 69 in the holder 15 is screwed into said threaded bore 67 to fasten the holder 15. The opening 69 can be formed as at least substantially matching the end face of the rotary axle 61 as a square or as a polygon.

A rotational movability of the holder 15 with respect to the transport mover 17 is ensured by the connection between the functional region 39 and the holder 15 implemented via the rotary axle 61, which is in particular advantageous if the transport movers—as FIGS. 2 and 3 show—are used as a pair of two for carrying a holder 15. The rotational movability in particular provides advantages on a cornering in comparison with a rigid arrangement of the holder 15 at the transport movers 17.

As FIGS. 4 and 5 show, the rotary axle 61 is secured at the lower side by a screw 75 engaging at the end face from below.

Plain bearings without a collar can also be provided as an alternative to the upper plain bearing 65 having a collar and/or to the lower plain bearing 73 which can also comprise a collar.

The rolling element 27 represented in FIG. 7a shows two examples of races, preferably comprising rubber, formed and/or arranged at the outer periphery of the movable part of a bearing 55. As is shown in the upper part section of FIG. 7a, such a brace 75 can have an approximately rectangular cross-section and can be arranged in an associated groove at the outer periphery of the movable part of the bearing 55. Alternatively—as is shown in the lower part section of FIG. 7a—a race 77 can be used which has a circular cross-section and which can likewise be arranged in an associated groove at the outer periphery of the movable part of the bearing 55. As FIG. 7b shows, an areal race 79 or a cover can also be provided at the outer periphery of the movable part of the bearing 55.

In the transport mover 17 shown in FIGS. 3 to 6, two rolling elements 27 which are located at different longitudinal sides of the functional region 39 are arranged at an axle 49.

In the transport mover system 19 represented in FIG. 8, each of the two transport movers 17 coupled to one another via the common holder 15 have a common axle 81 for two rolling elements 27. In addition, a rolling element 27 having a separate axle 83 is also arranged at each longitudinal side of each mover 17. In this respect, the axles 83 for only one rolling element 27 have an offset, viewed in the transport direction T, which can be in a range between 10 and 30 mm, for example.

The rolling elements 27 of the two transport movers 17 which have a common axle 81 are beside one another in the transport mover system 19 in accordance with FIG. 8. The rolling elements 27 having an offset form the front and rear rolling element pair, viewed in the transport direction T, in the transport mover system 19 in accordance with FIG. 8. The offset arrangement of the rolling elements 27 provides advantages on the bridging of path elements of the path system 21.

Figure 9:
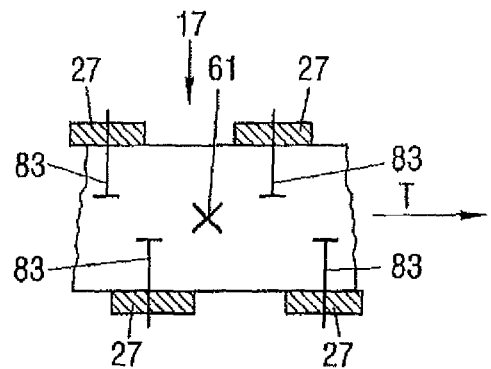
FIG. 9 a plan view of a transport mover.

In the transport mover 17 of FIG. 9, each rolling element 27 has its own axle 83. The axles 83 are arranged offset from one another viewed in the transport direction T. In this respect, as is shown in FIG. 9, the spacing between the axles 83 of the rear rolling element pair can differ from the spacing of the axles 83 of the front rolling element pair. Gaps at transitions between path elements can thereby be bridged particularly easily at all points of a transport mover 17. AU the transport movers 17, irrespectively whether for use as individual movers or as double movers coupled to form a transport mover system 19, can be designed uniformly in this structure and can be used in the path system 21 of FIG. 1, for example.

Figure 10:
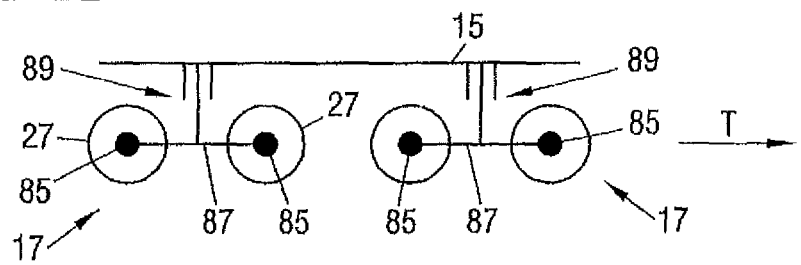
FIG. 10 a side view of a transport mover system.

In the transport mover system 19 of FIG. 10 schematically shown in a side view, each transport mover 17 has two rolling elements 27 at each longitudinal side, said rolling elements being arranged offset in the direction of movement T. The rolling elements 27 at each longitudinal side are connected to one another via a connection element 87 and are rigidly connected to the respective longitudinal side of the transport mover 17 or to its functional region (not shown). The rolling elements 27 are in this respect arranged at the free ends 85 of the bar-shaped connection element 87.

In a modified variant, the rolling elements 27 at both longitudinal sides of the transport mover 17 can be arranged at the same connection element 87 which then substantially forms the functional region of the transport mover 17 and at which the holder 15, as is schematically shown in FIG. 10, can likewise be arranged.

Figure 11:
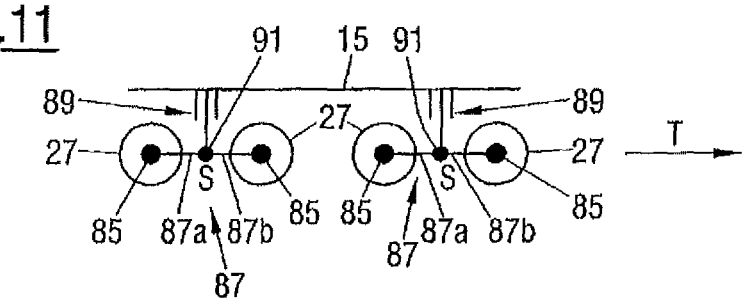
FIG. 11 a side view of a further transport mover system.

In the transport system of FIG. 11, each transport mover 17 has at least two rolling elements 27 at each of its longitudinal sides, said rolling elements being arranged offset in the direction of movement T, being connected to one another via the connection element 87 at each longitudinal side and being connected to the respective longitudinal side of the transport mover 17 or of the functional region. The connection element 87 is in this respect arranged at the respective longitudinal side of the transport mover 17 in a manner pivotable about a pivot axis S. The rolling elements 27 are thereby arranged in the manner of an oscillating suspension at the respective longitudinal side of the transport mover 17, whereby the transport mover 17 or the transport mover system 19 can achieve better travel properties.

Figure 12:
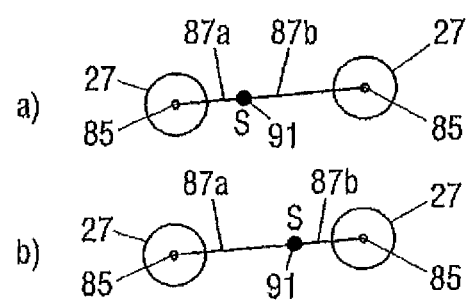
FIG. 12a a schematic representation for illustrating a suspension for two rolling elements of a transport mover.
FIG. 12b a schematic representation for illustrating a modified suspension of two rolling elements.

The connection element 87 comprises a first section 87a whose one end is arranged at the pivot axis S and at whose other, free end 85 one of the rolling elements 27 is arranged. The connection element 87 furthermore comprises a second section 87b whose one end is arranged at the pivot axis S and at whose other, free end 85 the other one of the rolling elements 27 is arranged. In the variant represented in FIG. 11, the sections 87a, 87b of the connection element 85 at least approximately have the same length. In contrast, modifications are shown in FIGS. 12a and 12b in which the sections 87a, 87b have different lengths.

A central support of the rolling elements 27 (cf. FIG. 11) or an off-center support of the rolling elements 27 (cf. FIG. 12) can thus be achieved. An off-center support brings about a changed travel behavior of the transport mover 17 and can have an advantageous effect on the travel behavior of the transport mover 17 e.g. on an impact on an object carrier.

Figure 13:
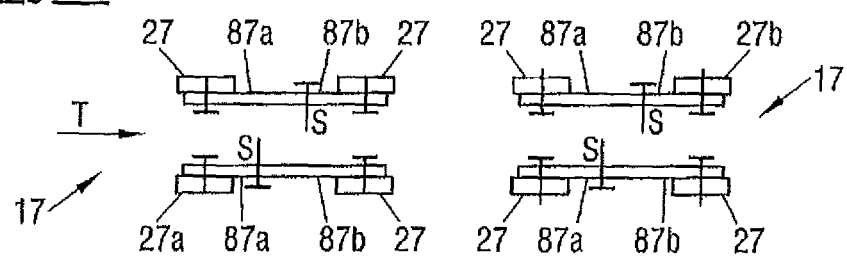
FIG. 13 a schematic representation of a transport system in a plan view for further illustration of suspensions for a respective two rolling elements at a longitudinal side of a transport mover.

FIG. 13 shows a schematic representation of a transport mover system 19 comprising two transport movers 17 coupled to one another in a plan view. In each transport mover 17, the pivot axis S at a longitudinal side is arranged offset with respect to the pivot axis S at the other longitudinal side of the transport mover 17, viewed in the direction of movement T. The travel behavior of the transport mover system 19 can thereby be improved.

A wheelset at a side can be pulled to the front somewhat outwardly at one transport mover 17 with respect to the other one in each case. For example, in the transport system 19 of FIG. 13—with respect to the drawn transport direction T—the right, rear rolling element 27 (27*a*) of the rear transport mover 17 can be pulled somewhat further to the rear. In addition, the left, front rolling element 27 (27*b*) of the front transport mover 17 can be pulled somewhat to the front. The travel behavior of the transport mover system 19 can thereby be further improved.

Sliding elements 29 such as are shown by way of example in FIGS. 14 to 17 can also be used instead of the rolling elements 27.

Figure 14:
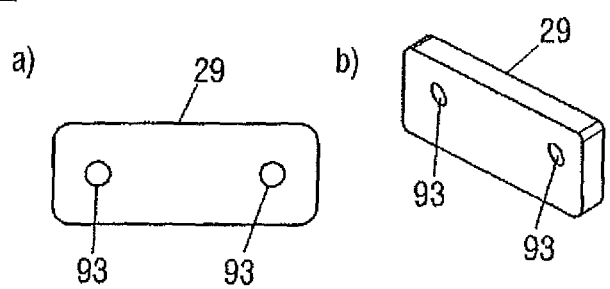
Figure 15:
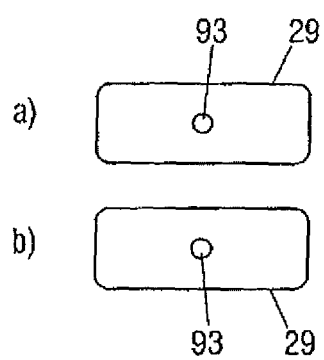
FIG. 15a a side view of a further variant of a sliding element.
FIG. 15b a side view of yet another variant of a sliding element.

A sliding element 29 can in particular—as FIG. 14 shows—have two openings 93 which are, for example, implemented in the form of a respective bore and whose spacing from one another is selected such that they can be fastened to the axles 49 of a transport mover 17 by the screws 59 already mentioned above (cf. FIG. 2). An elastic socket or an O-ring can be inserted into each opening 93 for damping. To be able to suspend a sliding element 29 in an oscillating manner, an opening 93 which is at the center (cf. FIG. 15*a*) or which is somewhat off-center (cf. FIG. 15*b*) can also be provided in the sliding element 29. The rotary bearing 91 (cf. FIG. 11) can, for example, be received in the opening 93.

Figures 16, 17:
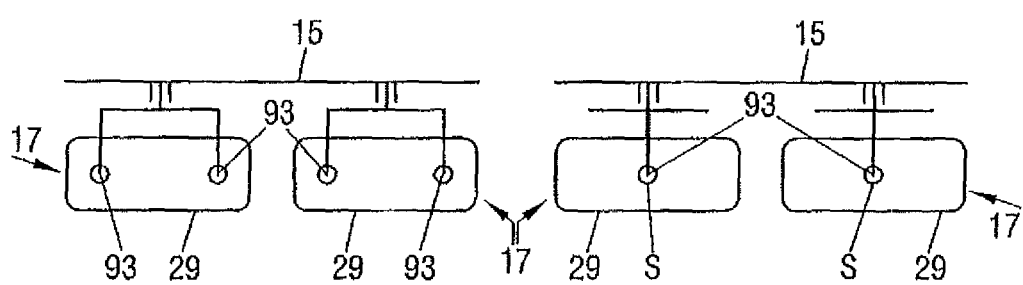
FIG. 16 a schematic side view of a transport mover system with sliding elements.
FIG. 17 a schematic side view of a further variant of a transport mover system with sliding elements.

FIGS. 16 and 17 each show a transport mover system 19 comprising sliding elements 29. The transport mover system in accordance with FIG. 17 in this respect has an oscillating suspension in which each sliding element 29 comprises only one opening 93 for the oscillating suspension. In FIG. 16, the sliding elements 29 are, in contrast, rigidly coupled to the transport movers 17.

Figure 18:
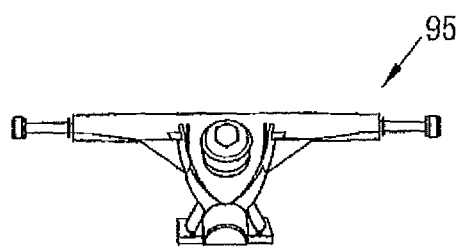
FIG. 18 a view of a skateboard axle for a transport mover.

FIG. 18 shows a skateboard axle 95 which can be arranged between the holder 15 and the functional region 39 in at least one transport mover 17 for an elastic support of the holder 15 at the functional region 39. On a cornering, the holder 15 can thus be inclined—in a manner comparable with a skateboard. The central elastic region is then deformed starting from the axle such that the functional region 39 likewise fixed thereto is somewhat crossed or inclined. This can in particular have a favorable effect on the cornering behavior in a transport system comprising two transport movers 17 which are coupled via the holder 15.

As mentioned above, provision is made that two transport movers 17 are coupled to one another via the holder 15 in a transport mover system 19. As FIG. 19*a* shows, an elastic and/or a rotationally movable coupling of two transport movers 17 can also take place via an articulated bar 97 which is preferably coupled to the functional region of the transport movers 17.

Figure 19:
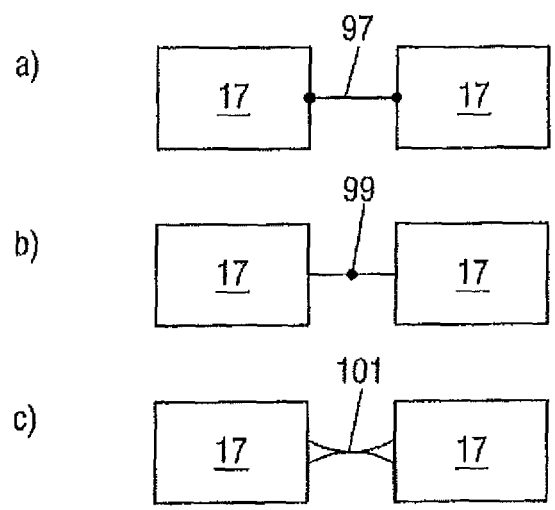
FIG. 19a a schematic side view of a variant of a transport mover system.
FIG. 19b a schematic side view of a further variant of a transport mover system.
FIG. 19c a schematic side view of yet a further variant of a transport mover system.

An elastic and/or a rotationally movable coupling of the two transport movers 17 can alternatively be achieved via a hinge 99 (FIG. 19*b*) or via a film hinge 101 (FIG. 19*c*). The hinge 99 and the film hinge 101 respectively are preferably likewise coupled to the functional region of each transport mover 17 in this respect.

Figure 20:
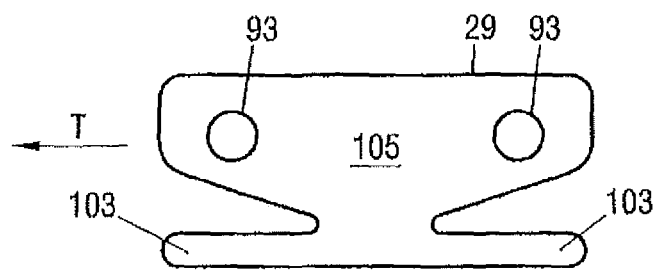
FIG. 20 a side view of a variant of a sliding element for a transport mover.
Figure 21:
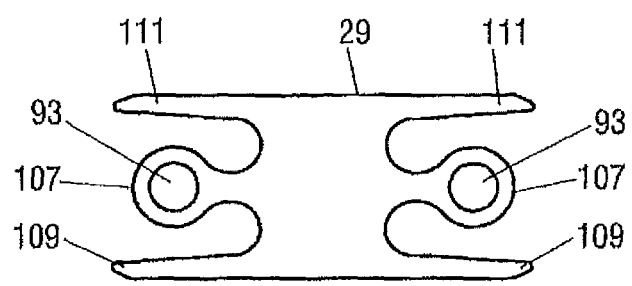
FIG. 21 a side view of another variant of a sliding element for a transport mover.

FIGS. 20 and 21 show two elastically configured sliding elements 29 in a side view. A better damping and a more uniform movement of the transport movers 17 can particularly be achieved by such sliding elements 29 on travelling over connection points between adjacent guides. Noises and influences on the payload can likewise be optimized.

The sliding element 29 of FIG. 20 is elastically designed by its shape, in particular in its lower region which is associated with the guide rail. The sliding element 29 in particular has two protrusions 103, which project from a middle region 105, in addition to slopes or radii at the end regions/corner regions. Due to the protrusions 103, an easy deflection is possible, for example, on travelling over connection points.

The openings 93 can be provided at elastic arms 107 in the sliding element 29 of FIG. 21, whereby the sliding element is in particular resilient in the region of the support. As FIG. 21 furthermore shows, the sliding element 2 has elastic lower end regions/corner regions 109 and elastic upper end regions/corner regions 111 facing the structure.

Figure 22:
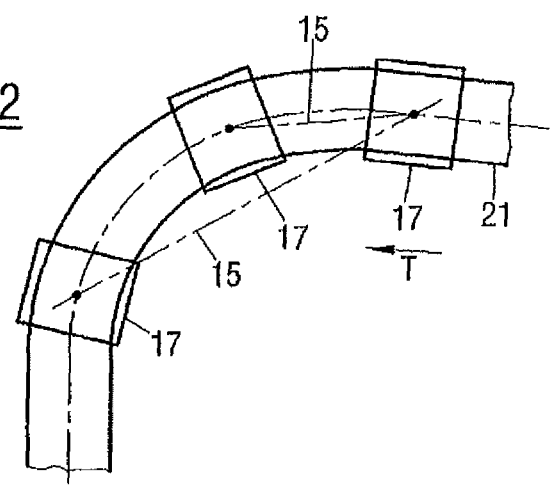
FIG. 22 a plan view of a path system and of a transport mover system with a variable spacing between two transport movers.

FIG. 22 shows a plan view of a path system 21 with a transport mover system which is arranged thereon and which comprises two transport movers 17 which are coupled to one another via a holder 15. In this respect, the transport mover 19 disposed at the front in the transport direction T is drawn twice for illustration purposes. In this variant, the transport movers 17 are adjustably arranged at the holder 15 along the transport direction T, whereby the spacing between the two transport movers 17 can be adjusted. This can, for example, be achieved in that the rotary axle (cf. the rotary axle 61) of the respective transport mover 17 is displaceably supported or arranged at the holder 15. A guide along which the rotary axle can be adjusted in the transport direction T can, for example, be provided in the holder 15.

The adjustability of the spacing of the two transport movers 17 is in particular of advantage during a cornering. If the transport movers 17 have a larger spacing, a carrier disposed at the holder 15 moves on a smaller, inner radius which is smaller than the path route radius. Centrifugal force influences are thereby reduced. The cornering speed can additionally be reduced. The spacing between the transport movers 17 can be reduced again or set to a normal value after travelling through a corner.

REFERENCE NUMERAL LIST 11 apparatus
13 carrier
15 holder
17 transport mover
19 transport mover system
21 path system
23 guide
25 guide rail
27 rolling element
27*a* rolling element
27*b* rolling element
29 sliding element
31 upper side, running surface
33 protrusion
35 projection
37 gap
39 functional region 41 magnetic region
43 seal
45 first passage
47 second passage
49 axle
51 fastening element
53 prolongation
55 bearing
57 race
59 screw
61 rotary axle
63 passage
65 plain bearing
67 threaded bore
69 opening
71 screw
73 plain bearing
75 race
77 race
79 race
81 axle
83 axle
85 free end
87 connection element
87a first section
87b second section
89 coupling
91 rotary bearing
93 opening
95 skateboard axle
97 articulated bar
99 hinge
101 film hinge
103 protrusion
105 middle region
107 elastic arm
109 end region/corner region
111 end region/corner region
T transport direction, direction of movement
S pivot axis

The invention claimed is:

1. An apparatus for moving objects, the apparatus comprising
a plurality of transport movers individually movable by means of magnetic conveying technology and/or linear motor technology for transporting the objects;
a path system for the transport movers in which the transport movers are movable along at least one predefined path in a transport direction; and
a control device for controlling the movements of the transport movers in the path system,
wherein the path system has a guide for the transport movers which extends along the path,
wherein at least one rolling element or sliding element is arranged at each transport mover, and
wherein the guide takes up at least substantially vertical forces via the rolling element or sliding element, with the guide having at least one running surface, which extends along the path, for the rolling element or sliding element,
wherein the guide has two parallel guide rails, with the upper side of one guide rail being provided as a running surface for at least one rolling element or sliding element which is formed at a longitudinal side of a transport mover, and with the upper side of the other guide rail being provided as a running surface for at least one rolling element or sliding element which is formed at the other longitudinal side of the transport mover,
wherein each guide rail has a protrusion at its side facing the other guide rail and each longitudinal side of a transport mover has a projection, with a respective projection engaging beneath a respective protrusion when the transport mover is arranged on the guide rails.

2. The apparatus in accordance with claim 1, wherein the projection extends at a spacing beneath the rolling element or sliding element such that an outwardly open gap is formed between the rolling element or sliding element and the projection.

3. The apparatus in accordance with claim 1, wherein the plurality of transport movers have a functional region, wherein the plurality of transport movers are arranged behind one another and have a common holder for carriers for objects to be transported, wherein the common holder is fastened to the functional region of the plurality of transport movers.

4. A transport mover for transporting objects,
wherein the transport mover has a functional region and, above said functional region, a holder for carriers for objects to be transported which is attached to the functional region,
wherein at least one rolling element or sliding element and, at a spacing beneath it, a projection are provided at each of the two longitudinal sides of the functional region such that an outwardly open gap for the engagement of a protrusion, which is formed at an associated guide rail for the transport mover, is present between the rolling element or sliding element and the projection,
wherein the functional region has at least one pair of rolling elements, with one rolling element of the pair being arranged at the one longitudinal side of the functional region and the other rolling element of the pair being arranged at the other longitudinal side of the functional region, and with at least one rolling element being offset with respect to the other rolling element along the direction of movement.

5. A transport mover for transporting objects,
wherein the transport mover has a functional region and, above said functional region, a holder for carriers for objects to be transported which is attached to the functional region,
wherein at least one rolling element or sliding element and, at a spacing beneath it, a projection are provided at each of the two longitudinal sides of the functional region such that an outwardly open gap for the engagement of a protrusion, which is formed at an associated guide rail for the transport mover, is present between the rolling element or sliding element and the projection,
wherein a magnetic region which is releasably fastened to the functional region is provided beneath the functional region,
wherein a first passage extends vertically upwardly in the functional region starting from the lower side of the functional region and a second passage intersects the first passage to receive an axle of the transport mover.

6. The transport mover in accordance with claim 5, wherein the rolling elements or sliding elements are removably arranged at the functional region.

7. The transport mover in accordance with claim 5, wherein the lower side of the functional region and the upper side of the magnetic region at least approximately contact one another when the magnetic region is fastened to the functional region.

8. The transport mover in accordance with claim 5,
wherein a fastening element fastened to the upper side of the magnetic region is plugged into the first passage;
wherein the axle is plugged into the second passage; and
wherein the fastening element is configured such that it engages behind the axle above the region in which the two passages intersect to fix and/or to tension the magnetic region with respect to the functional region.

9. The transport mover in accordance with claim 5, wherein the axle is arranged and/or fixed in the second passage in a manner secure against rotation.

10. The transport mover in accordance with claim 5, wherein the holder is rotatably connected to the functional region by means of a rotary axle, with the rotary axle being rotatably arranged in a passage which is preferably continuous and which extends in a vertical direction in the functional region.

11. The transport mover in accordance with claim 10, wherein the rotary axle is rotationally movably supported in the passage by means of at least one plain bearing.

12. The transport mover in accordance with claim 10, wherein the rotary axle has an end face which is disposed above the functional region and which is provided as a support surface for the holder.

13. The transport mover in accordance with claim 5, wherein the functional region has at least one pair of rolling elements, with one rolling element of the pair being arranged at the one longitudinal side of the functional region and the other rolling element of the pair being arranged at the other longitudinal side of the functional region, and with the two rolling elements having a common axle.

14. The transport mover in accordance with claim 5, wherein the transport mover has at least two rolling elements arranged offset in the direction of movement at each of its longitudinal sides, with the rolling elements being connected to one another via a connection element at each longitudinal side and being connected to the respective longitudinal side of the transport mover, with the connection element being arranged at the respective longitudinal side of the transport mover in a manner pivotable about a pivot axis, or with at least one sliding element being pivotably arranged about a pivot axis at each longitudinal side of the transport mover.

15. The transport mover in accordance with claim 14, wherein the connection element has a first section whose one end is arranged at the pivot axis and at whose other, free end one of the rolling elements is arranged; and wherein the connection element has a second section whose one end is arranged at the pivot axis and at whose other, free end the other rolling element is arranged, with the two sections having the same length or having different lengths.

16. The transport mover in accordance with claim 14, wherein the pivot axis at one longitudinal side of the transport mover has an offset with respect to the pivot axis at the other longitudinal side of the transport mover, viewed in the direction of movement.

17. The transport mover in accordance with claim 5, wherein at least one support which is elastically deformable at least regionally is provided between the holder and the functional region in at least one transport mover.

* * * * *